(12) United States Patent
You et al.

(10) Patent No.: US 11,190,079 B2
(45) Date of Patent: Nov. 30, 2021

(54) ROTOR AND MOTOR INCLUDING SAME

(71) Applicant: LG INNOTEK CO., LTD., Seoul (KR)

(72) Inventors: Young Jae You, Seoul (KR); Hyung Bin Im, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 262 days.

(21) Appl. No.: 16/099,795

(22) PCT Filed: May 15, 2017

(86) PCT No.: PCT/KR2017/005016
§ 371 (c)(1),
(2) Date: Nov. 8, 2018

(87) PCT Pub. No.: WO2017/196156
PCT Pub. Date: Nov. 16, 2017

(65) Prior Publication Data
US 2019/0140513 A1      May 9, 2019

(30) Foreign Application Priority Data

May 13, 2016  (KR) .................. 10-2016-0058837
Jun. 9, 2016   (KR) .................. 10-2016-0071820

(51) Int. Cl.
*H02K 9/06* (2006.01)
*H02K 5/24* (2006.01)
(Continued)

(52) U.S. Cl.
CPC ............. *H02K 5/24* (2013.01); *F04D 29/281* (2013.01); *F04D 29/30* (2013.01); *F04D 29/666* (2013.01); *H02K 5/20* (2013.01); *H02K 9/06* (2013.01)

(58) Field of Classification Search
CPC ...................................................... H02K 9/06
(Continued)

(56) References Cited

U.S. PATENT DOCUMENTS 4,253,800 A    3/1981   Segawa et al.
5,977,668 A *  11/1999  Yoshioka ............. F04D 29/023
                                                                 310/263
(Continued)

FOREIGN PATENT DOCUMENTS

FR    2 908 941     5/2008
FR    3 020 416     10/2015
(Continued)

OTHER PUBLICATIONS

European Search Report dated Apr. 24, 2019 issued in Application No. 17796456.6.
(Continued)

*Primary Examiner* — Alexander Talpalatski
(74) *Attorney, Agent, or Firm* — KED & Associates LLP

(57) ABSTRACT

The present invention comprises a rotor core and a cover disposed on the rotor core, wherein the cover includes a body part and a plurality of wing parts formed on the body part, the wing part is disposed between an outer boundary, which is a circular curve, and an inner boundary, which is a circular curve, the wing part includes an inner part and an outer part, the inner part forms a first inlet angle at a first point and forms a first outlet angle at a second point, the outer part forms a second inlet angle at a second point and forms a second outlet angle at a third point, the first point is positioned at the inner boundary, the second point is positioned at an intermediate boundary, which is a circular curve, disposed between the outer boundary and the inner boundary, and the third point can be positioned at the outer boundary.

2 Claims, 16 Drawing Sheets

(51) Int. Cl.
*F04D 29/30* (2006.01)
*F04D 29/66* (2006.01)
*F04D 29/28* (2006.01)
*H02K 5/20* (2006.01)

(58) Field of Classification Search
USPC .................................................. 310/62–63
See application file for complete search history.

(56) References Cited

U.S. PATENT DOCUMENTS

| | | | | |
|---|---|---|---|---|
| 9,537,373 | B2* | 1/2017 | Bledsoe | H02K 9/06 |
| 2003/0151316 | A1 | 8/2003 | Vasilescu | |
| 2007/0001524 | A1 | 1/2007 | Ishida | |
| 2014/0042867 | A1* | 2/2014 | Hui | H02K 9/04 |
| | | | | 310/227 |
| 2014/0225481 | A1 | 8/2014 | Murphy et al. | |
| 2015/0137633 | A1* | 5/2015 | Akiyoshi | H02K 5/20 |
| | | | | 310/62 |

FOREIGN PATENT DOCUMENTS

| | | |
|---|---|---|
| JP | 04-200255 A | 7/1992 |
| JP | 10-141276 A | 5/1998 |
| JP | 2000-092787 A | 3/2000 |
| JP | 2006-177235 A | 7/2006 |
| JP | 2009-162086 | 7/2009 |
| JP | 2010-216486 | 9/2010 |
| JP | 2015-104142 A | 6/2015 |
| KR | 10-2009-0042409 | 4/2009 |
| WO | WO 02/089299 | 11/2002 |

OTHER PUBLICATIONS

International Search Report dated Aug. 18, 2017 issued in Application No. PCT/KR2017/005016.
Japanese Office Action dated Jul. 6, 2021 issued in Application JP 2018-559334.

* cited by examiner

FIG. 15

|  | R1 | R2 | NOISE [dB] | MAXIMUM FREQUENCY [Hz] | HEIGHT OF MAXIMUM FREQUENCY [Hz] | AIR FLOW RATE [Kg/s] |
|---|---|---|---|---|---|---|
| Case1 | 2 | -3 | 83.2 | 1300 | 79.5 | 0.0407 |
| Case2 | 2 | -7 | 83.2 | 1300 | 78.9 | 0.0404 |
| Case3 | 2 | -11 | 83.2 | 1300 | 77.2 | 0.0403 |
| Case4 | 6 | -3 | 83 | 1300 | 78.9 | 0.0406 |
| Case5 | 6 | -7 | 83.4 | 1300 | 78.6 | 0.0403 |
| Case6 | 6 | -11 | 81.8 | 1700 | 77.5 | 0.041 |
| Case7 | 10 | -3 | 83.2 | 1700 | 78.2 | 0.0407 |
| Case8 | 10 | -7 | 82.5 | 1700 | 78.6 | 0.0403 |
| Case9 | 10 | -11 | 82.6 | 1700 | 78.5 | 0.0394 |

FIG. 16

| | R4 | R3 | NOISE [dB] | MAXIMUM FREQUENCY [Hz] | HEIGHT OF MAXIMUM FREQUENCY [Hz] | AIR FLOW RATE [Kg/s] |
|---|---|---|---|---|---|---|
| Case1 | 3 | 3 | 82.6 | 1700 | 78.1 | 0.04007 |
| Case2 | 3 | 13 | 81.6 | 1700 | 79.1 | 0.04015 |
| Case3 | 3 | 17 | 81.1 | 1700 | 77.3 | 0.04028 |
| Case4 | 7 | 3 | 82.7 | 1700 | 78.2 | 0.04002 |
| Case5 | 7 | 13 | 81.7 | 1700 | 79.1 | 0.04039 |
| Case6 | 7 | 17 | 81.4 | 1700 | 77.2 | 0.0403 |
| Case7 | 10 | 3 | 82.5 | 1700 | 78.1 | 0.04004 |
| Case8 | 10 | 13 | 82.2 | 1700 | 79.4 | 0.04041 |
| Case9 | 10 | 17 | 82 | 1700 | 77.2 | 0.04058 |

ROTOR AND MOTOR INCLUDING SAME

CROSS-REFERENCE TO RELATED PATENT APPLICATIONS

This application is a U.S. National Stage Application under 35 U.S.C. § 371 of PCT Application No. PCT/KR2017/005016, filed May 15, 2017, which claims priority to Korean Patent Application Nos. 10-2016-0058837, filed May 13, 2016 and 10-2016-0071820, filed Jun. 9, 2016, whose entire disclosures are hereby incorporated by reference.

TECHNICAL FIELD

Embodiments relate to a rotor and a motor including the same.

BACKGROUND ART

Generally, a vehicle includes a starter motor, which drives an engine, and an alternator, which generates electricity by using a rotational force of the engine. The starter motor rotates the engine when power of a battery is supplied.

In the alternator, a rotor is rotated by a driving force of the engine and generates alternating current (AC) power. A battery is charged with the generated power by using a rectifier and the like. Both the starter motor and alternator are configured as stator-rotor structures which are very similar to each other. That is, depending on applying a force or power, they may operate as a generator or may operate as a motor.

Recently, studies on a belt driven starter and generator (BSG) motor capable of performing functions of a starter motor and an alternator using one structure have been vigorously performed. Since the motor generates heat while rotationally operating, it is very significant to quickly dissipate the generated heat outward in order to prevent performance of the motor from being deteriorated. Particularly, it is very significant when the motor has a structure which rotates at a high speed like the BSG motor which performs functions of the starter motor and the alternator at the same time. Further, since noise of the motor is also a significant factor which determines performance of the motor, it is very important to minimize the noise.

DISCLOSURE

Technical Problem

The present invention is directed to providing a rotor capable of minimizing a loss of torque of a motor or occurrence of noise while securing a flow rate adequate for cooling, and a motor including the same.

Aspects of embodiments are not limited to the above-stated aspects and unstated other aspects can be clearly understood by those skilled in the art from the following description.

Technical Solution

One embodiment provides a rotor including a rotor core and a cover disposed above the rotor core. Here, the cover includes a body portion and a plurality of wing portions formed above the body portion. The wing portion is disposed between an outer boundary, which is a circular curve, and an inner boundary, which is a circular curve. The wing portion includes an inside portion and an outside portion. The inside portion includes a first inlet angle at a first point and a first outlet angle at a second point. The outside portion includes a second inlet angle at the second point and a second outlet angle at a third point. The first point is located on the inner boundary, the second point is located on an intermediate boundary, which is a circular curve disposed between the outer boundary and the inner boundary, and the third point is located on the outer boundary.

The outer boundary, the inner boundary, and the intermediate boundary may have the same center.

The first point may be an intersection point between the inner boundary and a central line between a leading edge and a trailing edge, the second point may be an intersection point between the intermediate boundary and the central line, and the third point may be an intersection point between the outer boundary and the central line.

The first inlet angle may be a contained angle between a tangent of the central line and a tangent of the inner boundary at the first point.

The first outlet angle may be a contained angle between a straight line, which connects an innermost end of the wing portion to the second point, and a tangent of the intermediate boundary at the second point.

The second inlet angle may be a contained angle between the tangent of the central line and a tangent of the intermediate boundary at the second point.

The second outlet angle may be a contained angle between the central line and a tangent of the outer boundary at the third point.

The cover may include a first cover disposed on any one side of the rotor core and a second cover disposed on the other side of the rotor core.

At least one of the number and position of the wing portion of the first cover may be different from the number or position of the wing portion of the second cover.

At least one of the first inlet angle, the first outlet angle, the second inlet angle, and the second outlet angle of the wing portion of the first cover may be different from the first inlet angle, the first outlet angle, the second inlet angle, or the second outlet angle of the wing portion of the second cover.

A position of the intermediate boundary of the wing portion of the first cover may be different from a position of the intermediate boundary of the wing portion of the second cover.

A height of at least a part of the inside portion of the wing portion may be formed to gradually increase toward the intermediate boundary, and a height of the outside portion of the wing portion may be formed to be equal from the intermediate boundary to the outer boundary.

A radius of the intermediate boundary may be a value obtained by addition a radius of the inner boundary to 50% to 70% of a difference between a radius of the outer boundary and the radius of the inner boundary.

The second inlet angle may be 50° to 70°, the first outlet angle may be 60° to 80°, and the second outlet angle may be 50° to 70°.

Another embodiment provides a motor including a rotating shaft, a rotor including a hole, in which the rotating shaft is disposed, and a stator disposed outside the rotor. Here, the rotor includes a rotor core and a cover disposed above the rotor core. The cover includes a body portion and a plurality of wing portions formed above the body portion. The wing portion is disposed between an outer boundary, which is a circular curve, and an inner boundary, which is a circular curve. The wing portion includes an inside portion and an outside portion. The inside portion includes a first inlet angle at a first point and a first outlet angle at a second point. The outside portion includes a second inlet angle at the second point and a second outlet angle at a third point. The first point is located on the inner boundary, the second point is located on an intermediate boundary, which is a circular curve disposed between the outer boundary and the inner boundary, and the third point is located on the outer boundary.

Another embodiment provides a rotor including a rotor core and a cover disposed above the rotor core. Here, the cover includes a body portion and a wing portion formed above the body portion. The wing portion includes wing groups each including a reference wing and a first wing and a second wing adjacent to the reference wing. The reference wing is disposed between the first wing and the second wing. A distance between a center of the first wing and a center of the reference wing is different from a distance between a center of the second wing and the center of the reference wing.

A line which connects the center of the reference wing to a center of the cover in a radial direction may be referred to as a first reference line. A line which connects the center of the first wing to the center of the cover in the radial direction may be referred to as a second reference line. A line which connects the center of the second wing to the center of the cover in the radial direction may be referred to as a third reference line. A first contained angle between the first reference line and the second reference line may be different from a second contained angle between the first reference line and the third reference line.

The wing portion may include thirteen wings, and a sum of the first contained angle and the second contained angle may be 17°.

The first contained angle may be 6°, and the second contained angle may be 11°.

The first wing and the second wing may be arranged between an inner boundary, which passes through an innermost end of the reference wing, and an outer boundary, which passes through an outermost end of the reference wing, in a circumferential direction.

The cover may include a first cover disposed on any one side of the rotor core and a second cover disposed on the other side of the rotor core.

At least one of the number and position of wings of the wing portion of the first cover may be different from the number or position of wings of the wing portion of the second cover.

The wing portion may include an inclined surface at a top end.

A shape of the reference wing, a shape of the first wing, and a shape of the second wing may be equal to one another.

A plurality of such wing groups may be included, and at least two of the wing groups may be disposed to be spaced at different distances apart in a circumferential direction.

The plurality of wing groups may include a reference wing group, a first wing group, and a second wing group which are mutually adjacent to one another. The first wing group may be disposed on any one side of the reference wing group. The second group may be disposed on the other side of the reference wing group. The first wing group and the second wing group may be arranged to be spaced at different distances apart in the radial direction on the basis of the reference wing group.

A line which connects a center of the reference wing group to the center of the cover may be referred to as a fourth reference line. A line which connects a center of the first wing group to the center of the cover may be referred to as a fifth reference line. A line which connects a center of the second wing group to the center of the cover may be referred to as a sixth reference line. A third contained angle between the fourth reference line and the fifth reference line may be different from a fourth contained angle between the fourth reference line and the sixth reference line.

The center of the reference wing group may be a radial center of a wing disposed in the middle of a plurality of wings included in the reference wing group. The center of the first wing group may be a radial center of a wing disposed in the middle of a plurality of wings included in the first wing group. The center of the second wing group may be a radial center of a wing disposed in the middle of a plurality of wings included in the second wing group.

The wing portion may include four wing groups and one wing, and a sum of the third contained angle and the fourth contained angle may be 21°.

The third contained angle may be 4°, and the fourth contained angle may be 17°.

The wing portion may include a plurality of such wing groups and one wing, and the one wing may be disposed between the wing groups mutually spaced farthest apart in a circumferential direction.

All the plurality of wing groups may be arranged while being spaced at different distances apart in a circumferential direction.

The wing group may include a plurality of wings, and the number, position, and shape of the wings of the plurality of wing groups may be equal.

The cover may include a first cover disposed on any one side of the rotor core and a second cover disposed on the other side of the rotor core.

At least one of the number and position of wings of the wing portion of the first cover may be different from the number or position of wings of the wing portion of the second cover.

Another embodiment provides a motor including a rotating shaft, a rotor, which surrounds the rotating shaft, and a stator disposed outside the rotor. Here, the rotor includes a rotor core and a cover disposed above the rotor core. The cover includes a body portion and a wing portion formed above the body portion. The wing portion includes mutually adjacent wing groups each including a reference wing and a first wing and a second wing adjacent to the reference wing. The reference wing is disposed between the first wing and the second wing. A distance between a center of the first wing and a center of the reference wing is different from a distance between a center of the second wing and the center of the reference wing.

Advantageous Effects

According to embodiments, a design range of a wing portion is largely extended by designing the wing portion to have two inlet angles and two outlet angles on the basis of an intermediate boundary located between an outer boundary and an inner boundary such that an advantageous effect of embodying the wing portion capable of minimizing a loss of torque or noise occurrence while securing a flow rate adequate for cooling may be provided.

DESCRIPTION OF DRAWINGS

FIG. 15 is a table illustrating a noise reduction effect caused by the anisotropy of the wings of the wing portion, and FIG. 16 is a table illustrating a noise reduction effect caused by the anisotropy of the wing group of the wing portion.

MODES OF THE INVENTION

Hereinafter, exemplary embodiments of the present invention will be described in detail with reference to the attached drawings. The purpose, particular advantages, and novel features of the present invention will be more clearly understood from the following detailed description and exemplary embodiments related to the attached drawings. Also, the terms used in the specification and the claims should not be limited to general or lexical meanings and should be interpreted as meanings and concepts coinciding with the technical concept of the present invention on the basis of a principle in which the inventor can appropriately define the concept of the terms to describe the invention in the best manner. Also, a detailed description on well-known related art that may unnecessarily obscure the essential of the present invention will be omitted.

The terms including ordinal numbers such as "second," "first," and the like may be used for describing a variety of components. However, the components are not limited by the terms. The terms are used only for distinguishing one component from another component. For example, without departing from the scope of the present invention, a second component may be referred to as a first component, and similarly, a first component may be referred to as a second component. The term "and/or" includes any and all combinations of one or a plurality of associated listed items.

Figure 1:
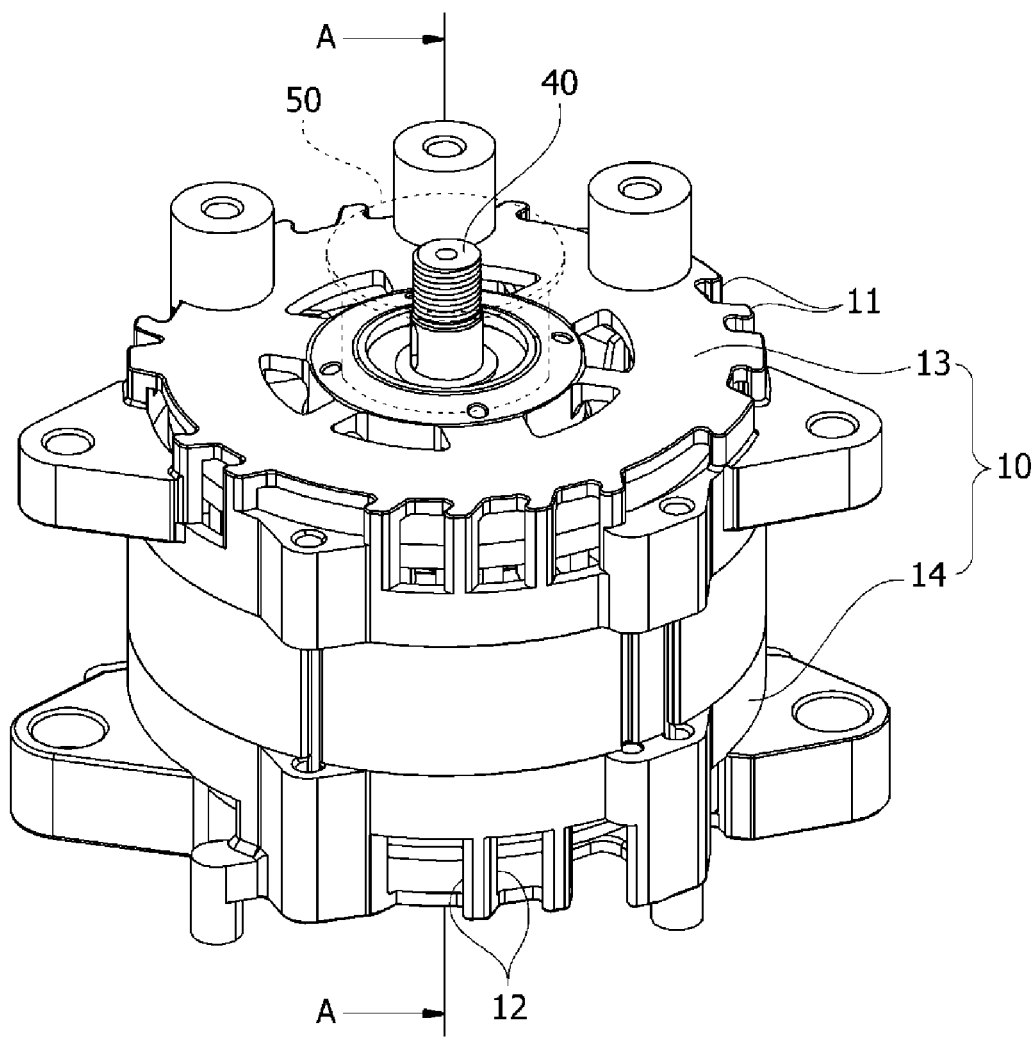
FIG. 1 is a view of a motor according to an embodiment.
Figure 2:
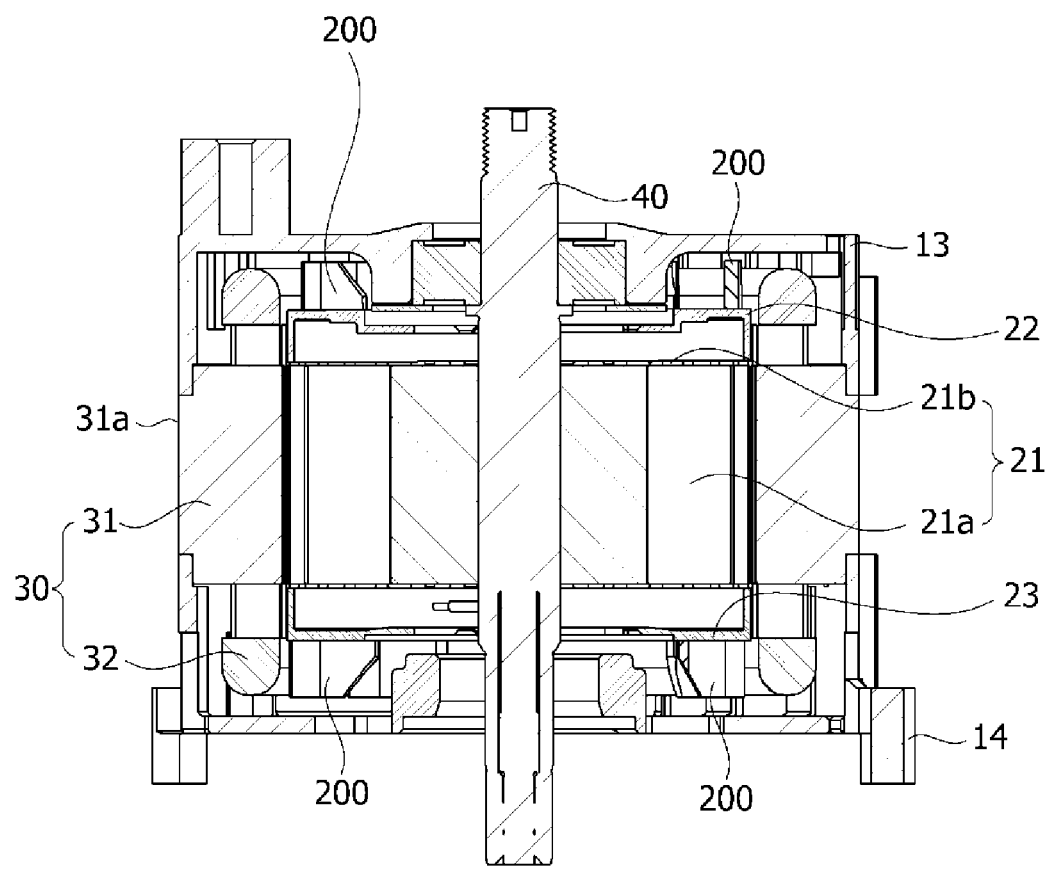
FIG. 2 is a view illustrating a cross section taken along a line A-A of FIG. 1.

FIG. 1 is a view of a motor according to an embodiment, and FIG. 2 is a view illustrating a cross section taken along a line A-A of FIG. 1.

Referring to FIGS. 1 and 2, the motor according to the embodiment may include a housing 10, a rotor 20, a rotating shaft 30, and a stator 40.

The housing 10 may include a plurality of through holes 11 and 12 arranged in an outer circumferential surface thereof.

When the motor operates as an alternator, a pulley 50 is rotated by driving of an engine and rotates the rotor 20 to generate an alternating current (AC). The generated AC may be converted into a direct current (DC) and be supplied to an external component (a battery and the like). On the other hand, when the motor operates as a starter, the rotor 20 is rotated by a current applied from the outside, and the pulley 50 rotates to drive an external component (an engine and the like).

The housing 10 may include a first housing 13 disposed on one side of the stator 30 and a second housing 14 disposed on the other side of the stator 30. The first housing 13 and the second housing 14 may include the plurality of through holes 11 and 12 formed along a circumferential direction. The through holes 11 and 12 dissipate heat generated inside the motor outward.

The first housing 13 and the second housing 14 may include protrusions (not shown) formed on inner circumferential surfaces thereof and combined with an outer surface of the stator 30.

The rotor 20 may include a rotor core 21, a cover 22, and a first coil 21b.

The rotor core 21 rotates inside the stator 30. A magnet may be attached to an inside or an outer circumferential surface of the rotor core 21.

The stator 30 may include a stator core 31 and a second coil 32 wound on the stator core 31. A part 31a of the stator core 31 may be exposed between the first housing 13 and the second housing 14. Accordingly, heat generated by the stator 30 may be easily discharged outward. However, the stator 30 is not limited thereto and may be disposed inside the housing 10.

Meanwhile, covers 22 and 23 are combined with and integrally rotate with the rotor core 21. A first cover 22 and a second cover 23 may be arranged on one side and the other side of the rotor core 21, respectively.

The first cover 22 and the second cover 23 include protruding wing portions 200. The wing portion 200 performs a function of a cooling fan which generates a gas flow when the rotor 20 rotates. The wing portion 200 may have a certain curvature to easily generate a gas flow.

Figure 3:
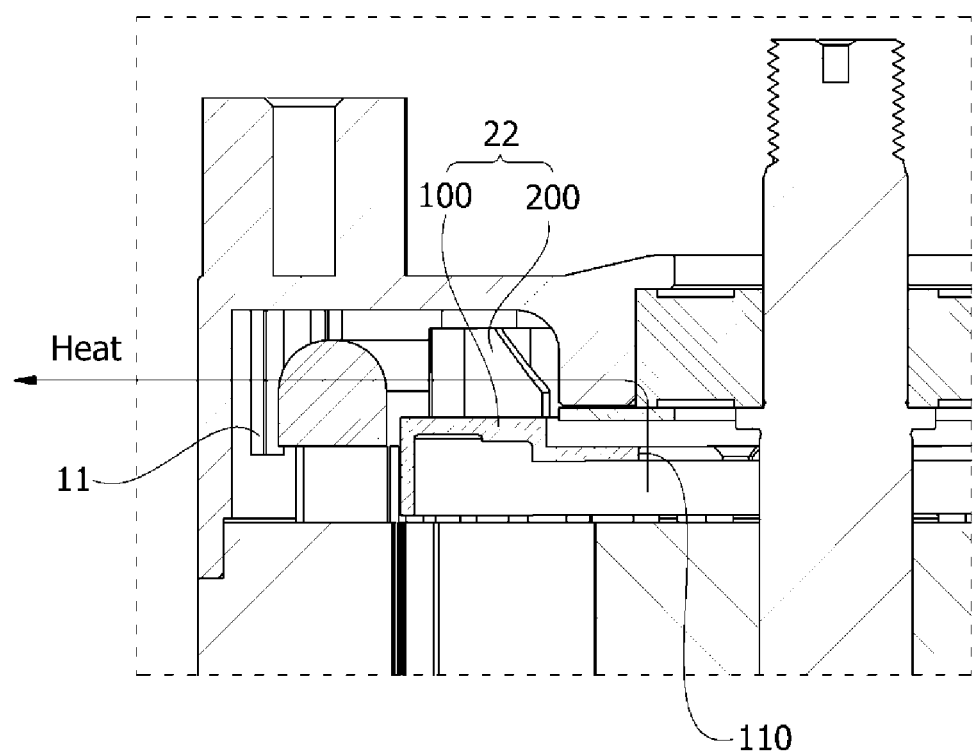
FIG. 3 is a view illustrating a process of dissipating heat generated in assembling of a rotor.

FIG. 3 is a view illustrating a process of dissipating heat generated in assembling of a rotor.

Referring to FIG. 3, when the rotor 20 rotates, a gas flow is generated by the wing portion 200 in the motor. Accordingly, heat generated by the rotor core 21 is easily discharged outward through a through hole 11 formed in a body portion 100 of the first cover 22 and a through hole 11 formed in the housing 10. This structure is advantageous to the motor which generates a large amount of heat due to high-speed rotation. Although not shown in the drawings, heat generated by the rotor core 21 may also be discharged in the same way in the second cover 23.

Figure 4:
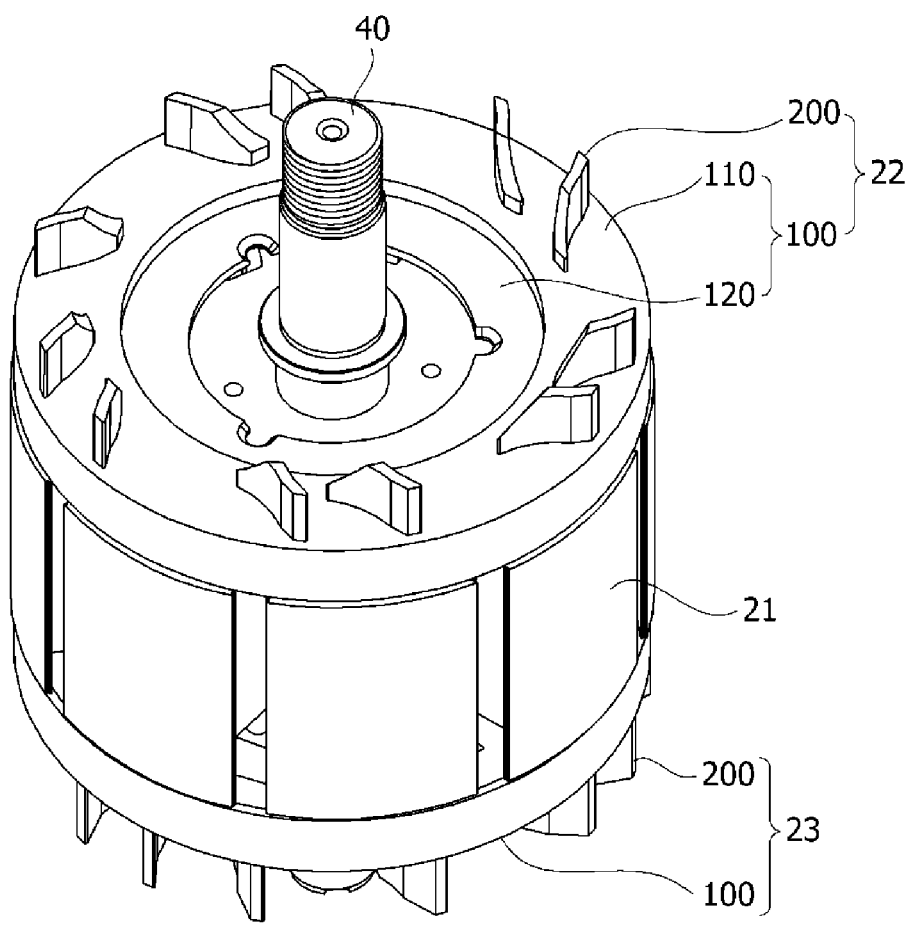
FIG. 4 is a perspective view of a rotor according to an embodiment.

FIG. 4 is a perspective view of the rotor according to the embodiment.

Referring to FIG. 4, the first cover 22 and the second cover 23 may include the body portion 100, which covers one side or the other side of the rotor core 21, and the wing portion 200, which protrudes from the body portion 100 in an axial direction.

The cover 22 may be manufactured by molding a resin. Also, the body portion 100 and the wing portion 200 may be integrally formed. This structure has advantages such as easy mass production, reduced manufacturing costs, and a high degree of freedom in design in comparison to a structure formed by manufacturing and assembling components.

The body portion 100 may include a ring-shaped edge portion 110 and a central portion 120 receding from the edge portion 110. The edge portion 110 is formed to have a ring shape and includes a plurality of such wing portions 200 arranged along a circumferential direction. The wing portions 200 may be regularly or irregularly arranged.

The central portion 120 is a part through which the rotating shaft 30 passes through and is inserted and which may recede in comparison to the edge portion 110. As the central portion 120 of the body portion 100 is lowered, a height of the belt pulley 50 (refer to FIG. 2) is also decreased such that the motor may be miniaturized.

Figure 5:
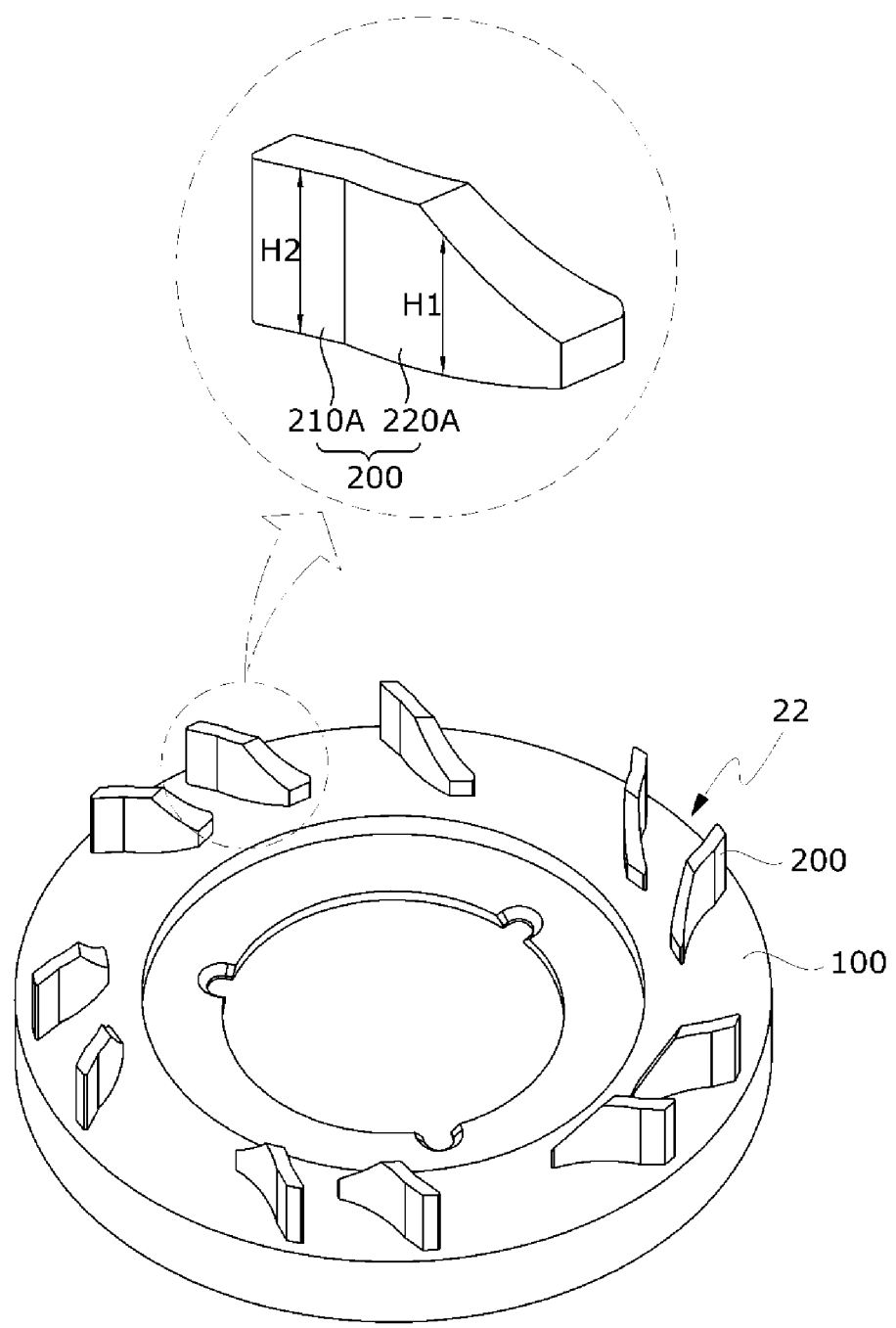
FIG. 5 is a view illustrating a first cover.
Figure 6:
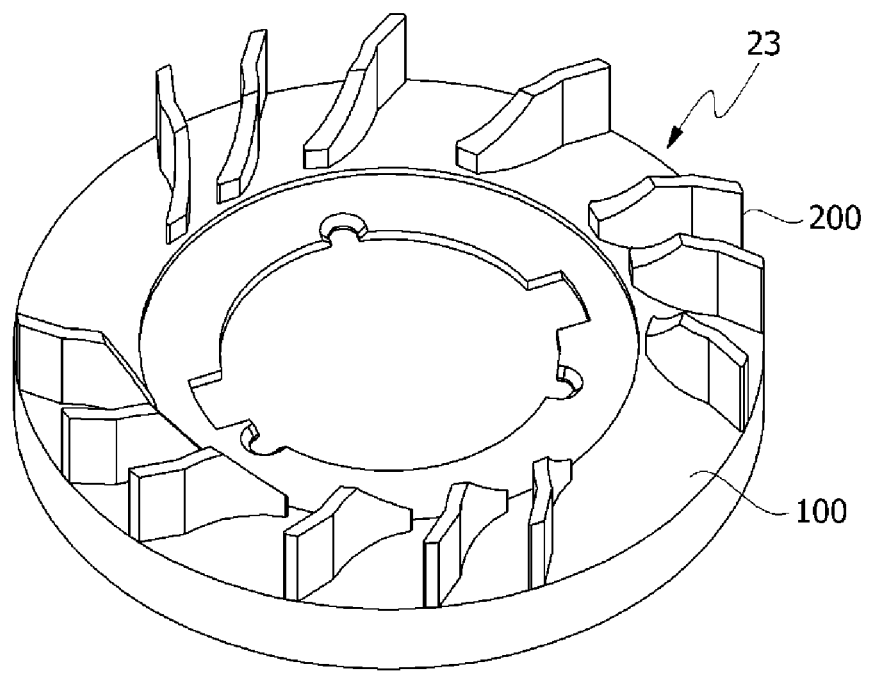
FIG. 6 is a view illustrating a second cover.

FIG. 5 is a view illustrating the first cover, and FIG. 6 is a view illustrating the second cover.

Referring to FIGS. 5 and 6, the number and positions of the wing portions 200 provided at the first cover 22 may be different from the number and positions of the wing portions 200 formed on the second cover 23.

Here, a height H2 of an outside portion 210A of the wing portion 200 may be different from a height H1 of an inside portion 220A. In detail, a part of the height H1 of the inside portion 220A may be formed to gradually increase toward an intermediate boundary 3. That is, a part of an upper edge of the inside portion 220A may be formed to incline. On the other hand, the height H2 of the outside portion 210A of the wing portion 200 may be equally formed from the intermediate boundary 3 to an outer boundary 2. The upper edge of the outside portion 210A may be formed to be horizontal.

Figure 7:
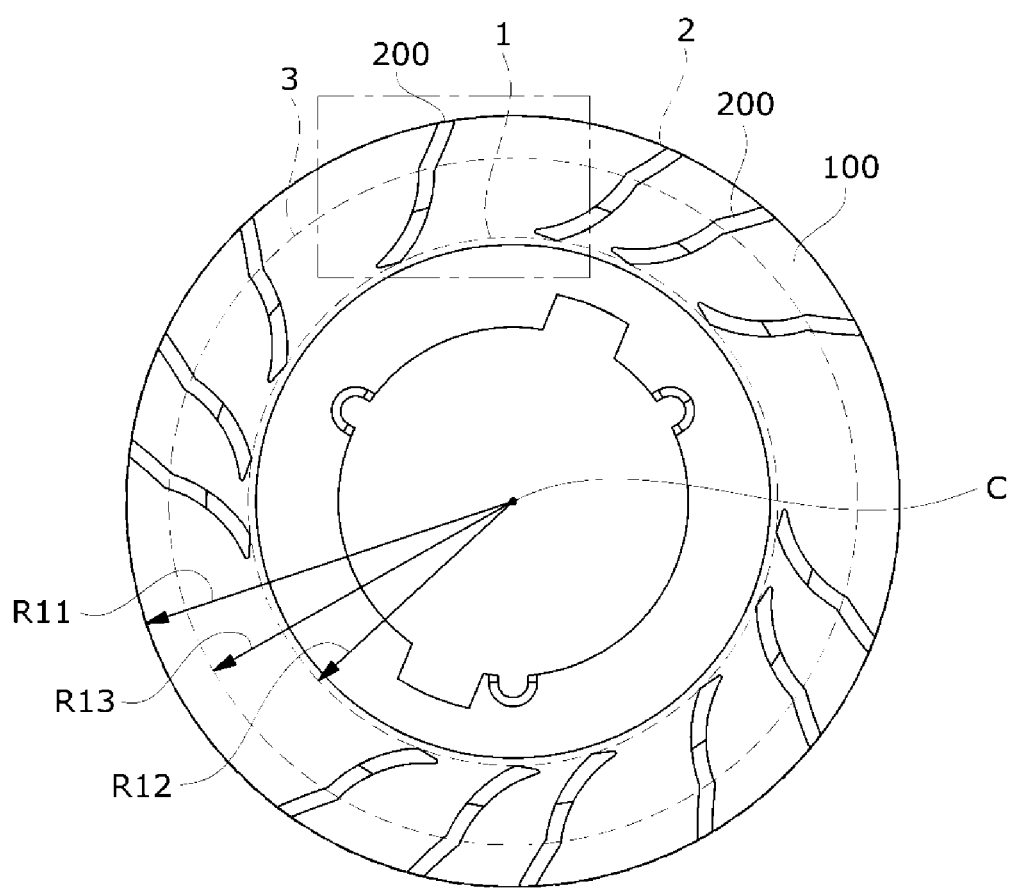
FIG. 7 is a concept view illustrating a wing portion of a second cover.
Figure 8:
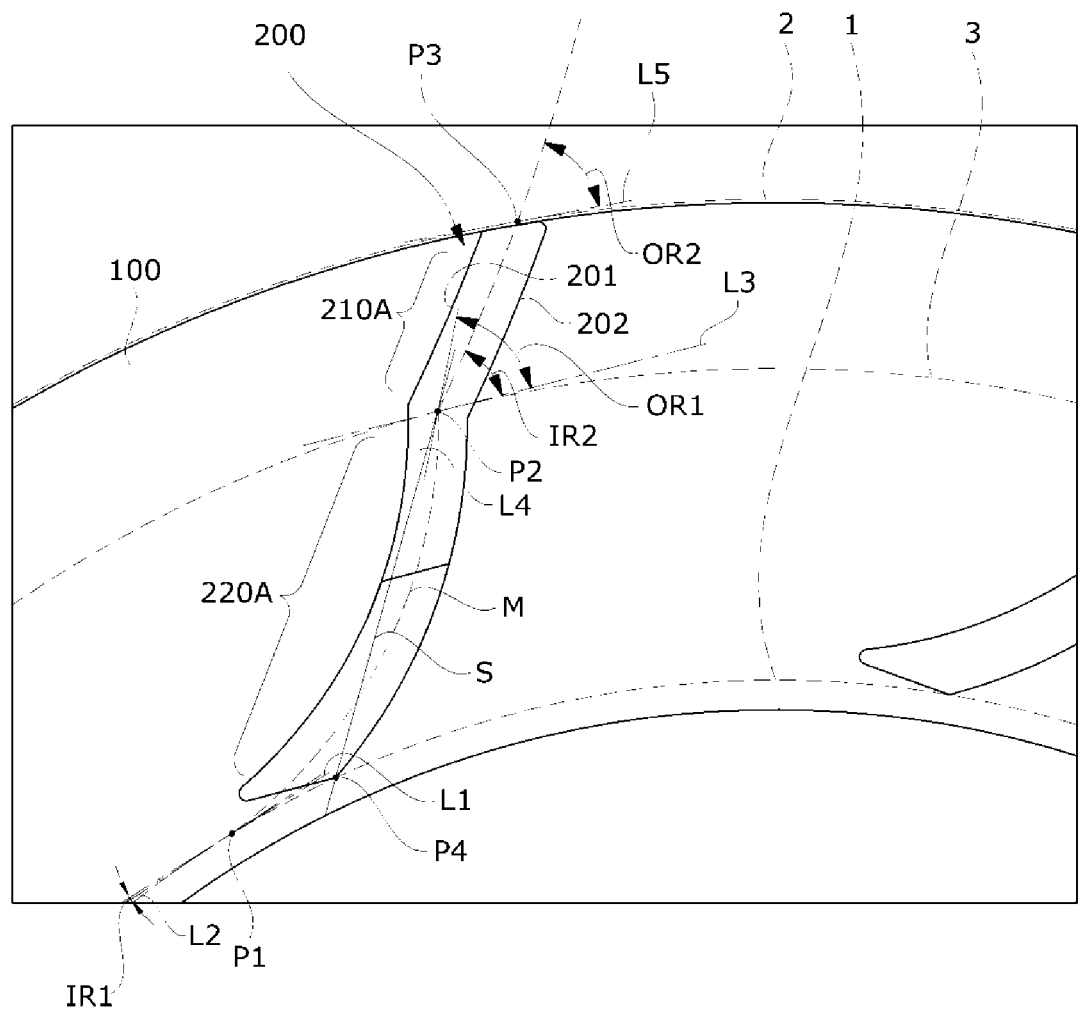
FIG. 8 is a detailed view of the wing portion shown in FIG. 7.

FIG. 7 is a concept view illustrating the wing portion of the second cover, and FIG. 8 is a detailed view of the wing portion shown in FIG. 7.

Referring to FIGS. 7 and 8, the wing portions 200 may be arranged between a circular inner boundary 1 and the outer boundary 2 on the basis of concentricity C. In detail, the wing portions 200 may be arranged such that an outermost end is located on the same radius on the basis of the concentricity C and an innermost end is located on the same radius on the basis of the concentricity C. The inner boundary 1 and the outer boundary 2 become references which determine an inlet angle and an outlet angle of the wing portion 200.

In addition, the wing portion 200 of the motor according to the embodiment has a configuration in which an additional inlet angle and outlet angle are set on the basis of the intermediate boundary 3 located between the inner boundary 1 and the outer boundary 2 on the basis of the concentricity C.

The wing portion 200 may be divided into the outside portion 210A located outside and the inside portion 220A located inside on the basis of the intermediate boundary 3.

In the outside portion 210A, an inlet angle and an outlet angle are set on the basis of the intermediate boundary 3 and the outer boundary 2.

In the inside portion 220A, an inlet angle and an outlet angle are set on the basis of the intermediate boundary 3 and the inner boundary 1.

Accordingly, the wing portion 200 of the motor according to the embodiment may be embodied by setting two inlet angles and two outlet angles.

In detail, in the inside portion 220A, a first inlet angle IR1 may be formed at a first point P1 located on the inner boundary 1 and a first outlet angle OR1 may be formed at a second point P2 located on the intermediate boundary 3.

Here, the first point P1 may mean an intersection point between a cord line M between a leading edge 201 and a trailing edge 202 of the wing portion 200 and the inner boundary 1. Also, the second point P2 may mean an intersection point between the intermediate boundary 3 and the cord line M.

Also, the first inlet angle IR1 may correspond to a contained angle between a tangent L1 of the inner boundary 1 and a tangent l2 of the cord line M at the first point P1. Also, the first outlet angle OR1 corresponds to a contained angle between a straight line S which connects an innermost end P4 of the wing portion 200 to the second point P2 and a tangent L3 of the intermediate boundary 3 at the second point P2.

In detail, in the outside portion 210A, a second inlet angle IR2 may be formed at the second point P2 and a second outlet angle OR2 may be formed at a third point P3 located on the outer boundary 2.

Here, the third point P3 may mean an intersection point between the cord line M and the outer boundary 2.

Also, the second inlet angle IR2 may correspond to a contained angle between a tangent L3 of the intermediate boundary 3 and a tangent L4 of the cord line M at the second point P2. Also, the second outlet angle OR2 may correspond to a contained angle between the cord line M and a tangent L5 of the outer boundary 2 at the third point P3.

As described above, in the wing portion 200 of the motor according to the embodiment, the inlet angles and the outlet angles of the inside portion 220A located inside the intermediate boundary 3 and the outside portion 210A located outside the intermediate boundary 3 are separately set and embodied by adding the intermediate boundary 3 in addition to the inner boundary 1 and the outer boundary 2, which become references for setting the inlet angles and outer angles, such that the wing portion 200 has a configuration capable of greatly extending a design range. Also, the wing portion 200 has a configuration capable of greatly extending a design range by changing a position of the intermediate boundary 3 and changing the inlet angles and outlet angles corresponding thereto.

Accordingly, the configuration of the wing portion 200 has very effective advantages in being an optimal design capable of reducing a loss of torque and noise occurrence of the motor caused by the wing portion 200 while securing a flow rate of an air blow for cooling.

Meanwhile, positions of the inlet angles, the outlet angles, and the intermediate boundary 3 in the wing portion 200 provided at the first cover 22 and the wing portion 200 formed on the second cover 23 may be formed to be different from one another to embody an optimum value with respect to a flow rate, a loss of torque, and reduction of noise.

For example, when a radius R13 (refer to FIG. 7) of the intermediate boundary 3 is a value obtained by adding a radius R12 of the inner boundary 1 to 50% to 70% of a difference between a radius R11 (refer to FIG. 7) of the outer boundary 2 and the radius R12 of the inner boundary 1, it may be seen that a loss of torque in comparison to a flow rate is minimized when the second inlet angle IR2 is within a range of 50° to 70°, the first outlet angle OR1 is within range of 60° to 80°, and the second outlet angle OR2 is within a range of 50° to 70°.

Figure 9:
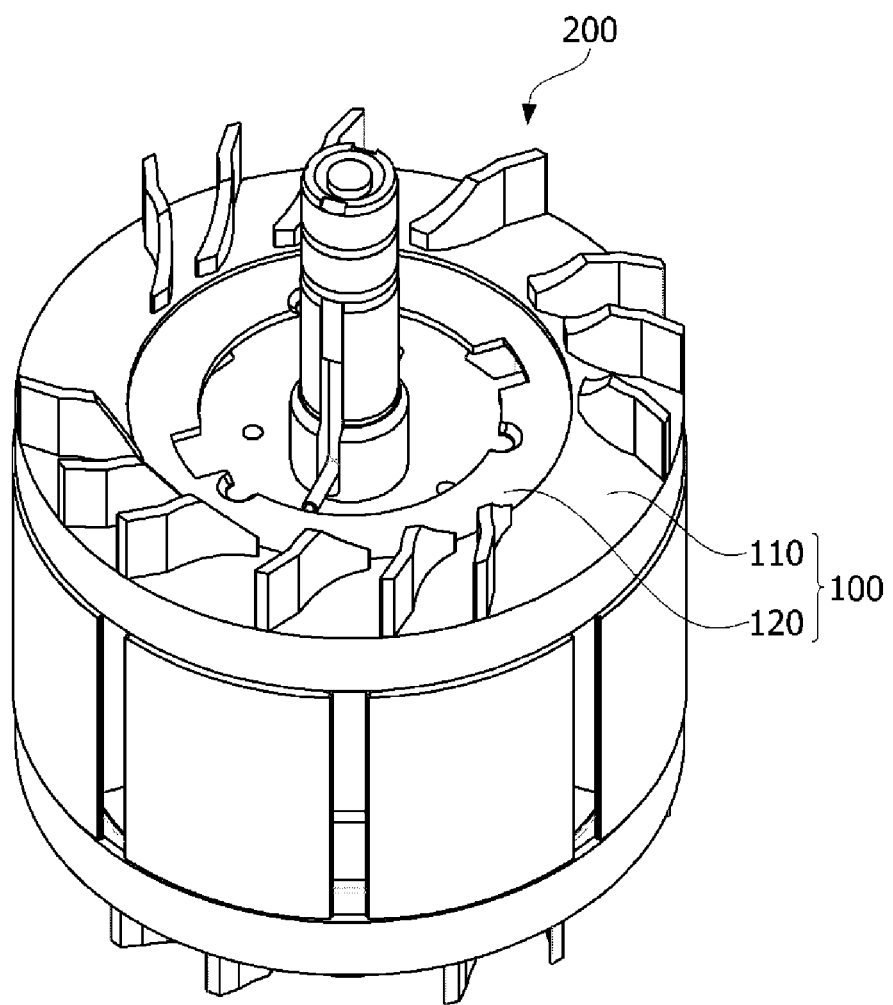
FIG. 9 is a perspective view of a rotor according to another embodiment.

FIG. 9 is a perspective view of a rotor according to another embodiment.

Referring to FIG. 9, a body portion 100 may include a ring-shaped edge portion 110 and a central portion 120 receding from the edge portion 110. The edge portion 110 is formed to have a ring shape and includes a plurality of wing portions 200 arranged along a circumferential direction. The wing portions 200 may be regularly or irregularly arranged.

Figure 10:
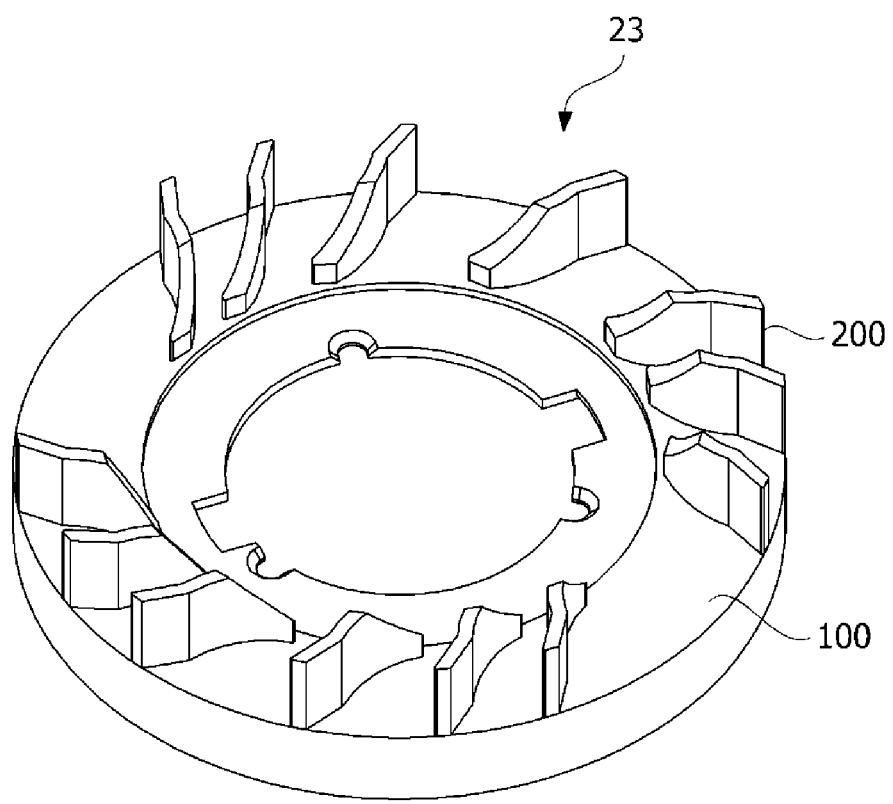
FIG. 10 is a view illustrating a cover.
Figure 11:
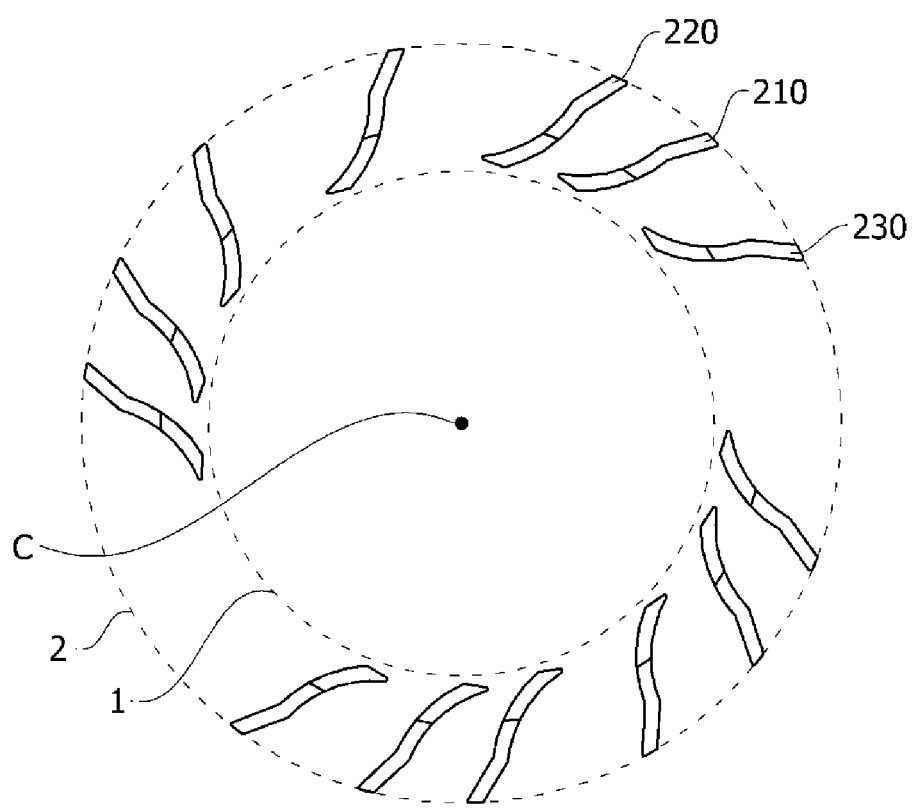
FIG. 11 is a view illustrating a wing portion of the cover.

FIG. 10 is a view illustrating a cover, and FIG. 11 is a view illustrating a wing portion of the cover. As described above, FIGS. 10 and 11 clearly illustrate only significantly featured parts to allow the embodiment to be clearly conceptually understood such that a variety of illustrations are expected and the scope of the embodiment should not be limited by a particular shape shown in the drawing.

The number and positions of the wing portions 200 provided at the first cover 22 (refer to FIG. 4) may be different from the number and positions of the wing portions 200 formed on the second cover 23.

Referring to FIGS. 10 and 11, the wing portions 200 formed on the second cover 23 may be arranged between a circular inner boundary 1 and an outer boundary 2 on the basis of concentricity C. In detail, the wing portions 200 may be arranged such that an outermost end is located on the same radius on the basis of the concentricity C and an innermost end is located on the same radius on the basis of the concentricity C. The inner boundary 1 and the outer boundary 2 become references which determine an inlet angle and an outlet angle of the wing portion 200.

The wing portion 200 may include a reference wing 210, a first wing 220, and a second wing 230. The three wings 210, 220, and 230 may be a wing group including relatively adjacent wings.

The reference wing 210 may be a wing located in the middle of the three wings 210, 220, and 230. The first wing 220 may be a wing located on one side of the reference wing 210. The second wing 230 may be a wing located on the other side of the reference wing 210.

Here, the first wing 220 and the second wing 230 may be disposed in different positions on the basis of a circumferential direction of the reference wing 210. This is for embodying anisotropy of the wing portion 200. When wings of the wing portion 200 are isotropic, noise may increase due to resonance. Accordingly, the wings of the wing portion 200 are embodied to be anisotropic so as to reduce noise. Here, the circumferential direction refers to a circumferential direction based on concentricity C which is a center of the rotor 20.

Figure 12:
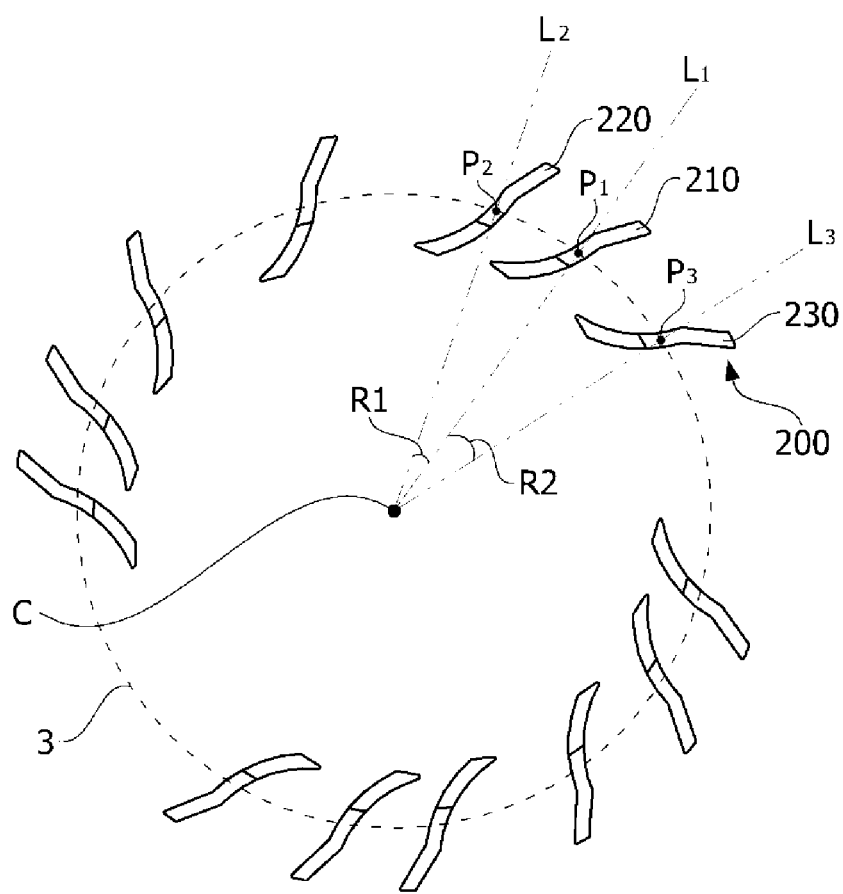
FIG. 12 is a view illustrating anisotropy of wings of a wing portion.

FIG. 12 is a view illustrating anisotropy of the wings of the wing portion.

Referring to FIG. 12, on the basis of the reference wing 210, positions of the first wing 220 and the second wing 230 are different from each other. A detailed description thereof is as follows.

A line which connects a center P1 of the reference wing 210 to a center C of the cover in a radial direction is referred to as a first reference line L1. Also, a line which connects a center P2 of the first wing 220 to the center C of the cover in a radial direction is referred to as a second reference line L2. Also, a line which connects a center P3 of the second wing 230 to the center C of the cover in a radial direction is referred to as a third reference line L3. In FIG. 7, 3 refers to a virtual reference line, which connects the centers of the wings of the wing portion 200 to one another in a radial direction.

A contained angle R1 between the first reference line L1 and the second reference line L2 is formed to be different from a contained angle R2 between the first reference line L1 and the third reference line L3 so as to embody anisotropy of the wing portion 200.

Here, a sum of the contained angle R1 and the contained angle R2 may be 17°. In detail, the contained angle R1 may be 6° and the contained angle R2 may be 11°.

In the wing portion 200, the first wing 220 and a plurality of wing groups including the first wing 220 and the second wing 230 may be arranged as one bundle. As shown in FIG. 7, when the wing portion 200 includes a total of thirteen wings, the thirteen wings may include four wing groups and one wing.

Figure 13:
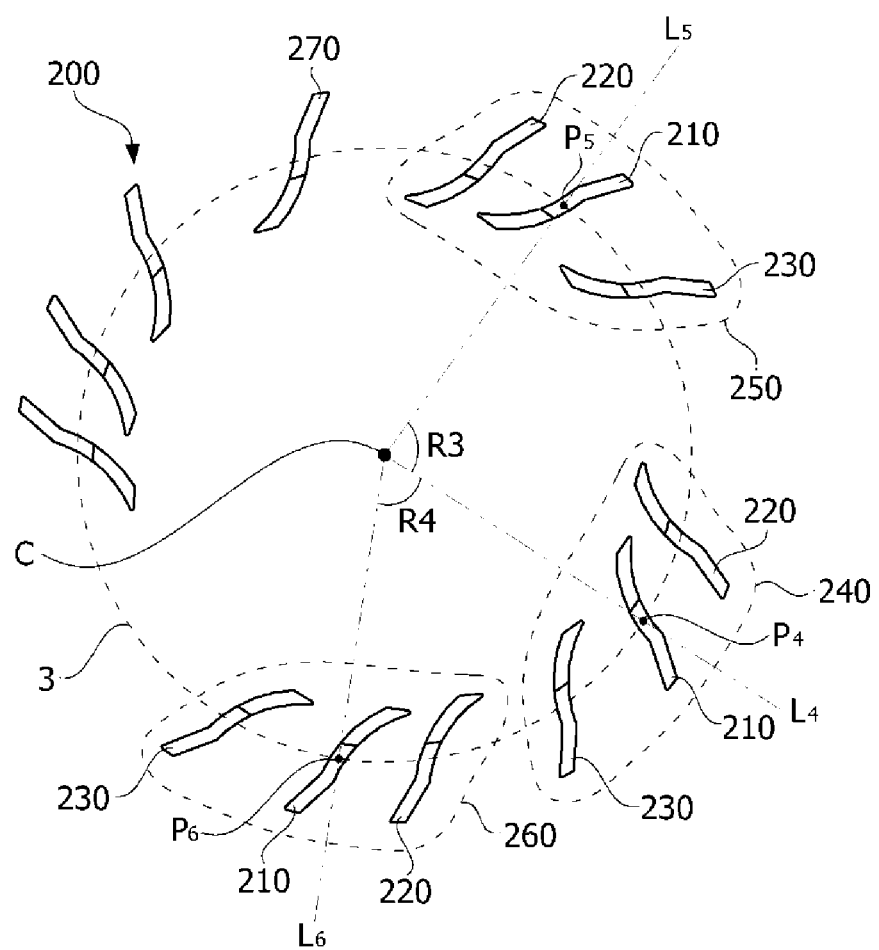
FIG. 13 is a view illustrating anisotropy of the wing portion.
Figure 14:
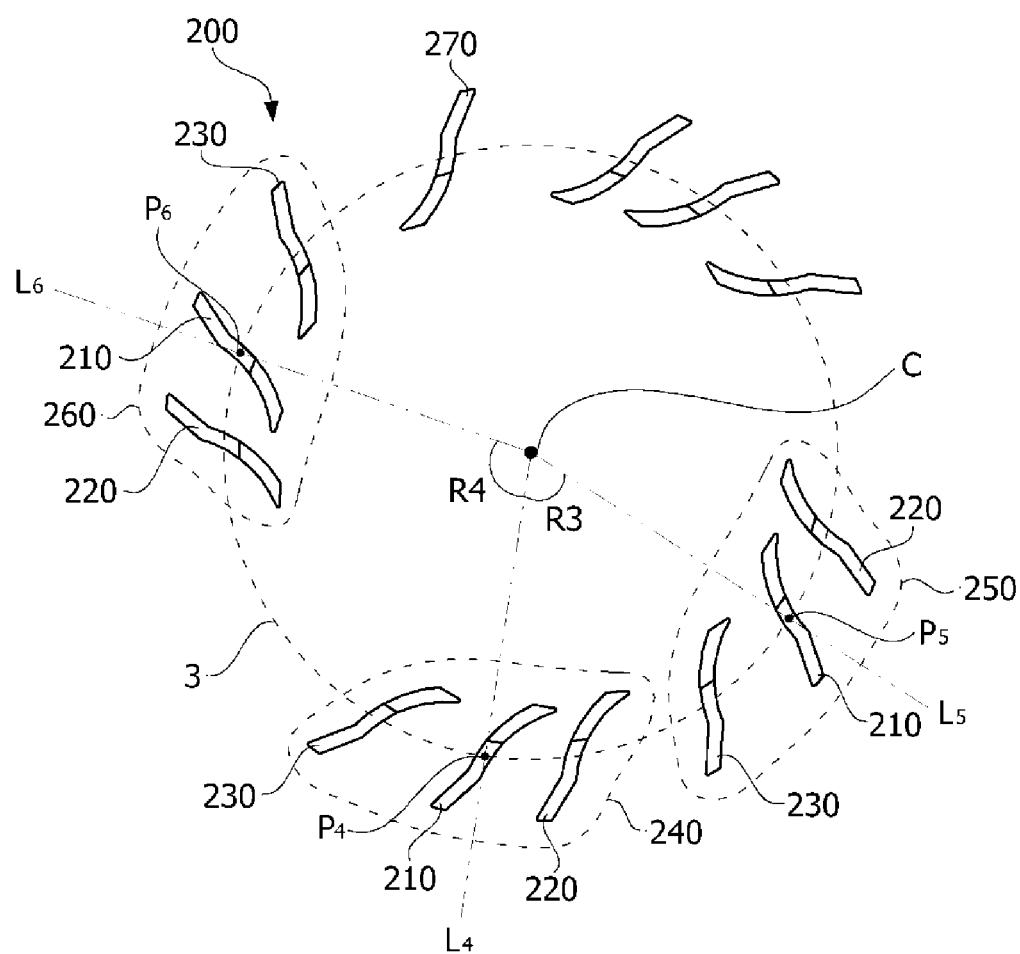
FIG. 14 is a view illustrating anisotropy of the wing portion in which a reference wing group is changed from that of FIG. 13.

FIG. 13 is a view illustrating anisotropy of the wing portion, and FIG. 14 is a view illustrating anisotropy of the wing portion in which a reference wing group is changed from that of FIG. 13.

Referring to FIGS. 13 and 14, the wing portion 200 may include a plurality of wing groups 240, 250, and 260. The wing groups 240, 250, and 260 refer to bunches which include the plurality of wings 210, 220, and 230 and which are adjacent to one another. The wing groups 240, 250, and 260 may be arranged to have anisotropy.

For example, on the basis of the reference wing group 240, positions of a first wing group 250 and a second wing group 260 are different from each other. A detailed description thereof is as follows.

A line which connects a center P4 of the reference wing group 240 to the center C of the cover in a radial direction is referred to as a fourth reference line L4. Here, the center P4 of the reference wing group 240 refers to a radial center of the first wing 210 located in the middle of the three wings 210, 220, and 230 included in the reference wing group 240.

Also, a line which connects a center P5 of the first wing group 250 to the center C of the cover in a radial direction is referred to as a fifth reference line L5. Here, the center P5 of the first wing group 250 refers to a radial center of the first wing 210 located in the middle of the three wings 210, 220, and 230 included in the first wing group 250.

Also, a line which connects a center P6 of the second wing group 260 to the center C of the cover in a radial direction is referred to as a sixth reference line L6. Here, the center P6 of the second wing group 260 refers to a radial center of the first wing 210 located in the middle of the three wings 210, 220, and 230 included in the second wing group 260.

A contained angle R3 between the fourth reference line L4 and the fifth reference line L5 is formed to be different from a contained angle R4 between the fourth reference line L4 and the sixth reference line L6 so as to embody anisotropy of the wing portion 200.

Here, a sum of the contained angle R3 and the contained angle R4 may be 21°. In detail, the contained angle R3 may be 4° and the contained angle R4 may be 17°.

Meanwhile, on the basis of the reference wing 210 in the wings 210, 220, and 230 included in each of the plurality of wing groups 240, 250, and 260, the first wing 220 and the second wing 230 are disposed in different positions in a radial direction so as to embody anisotropy.

As shown in FIGS. 13 and 14, the wing portion 200 includes thirteen wings. For example, the wing portion may include four wing groups and one wing, and each of the wing groups may include three wings. Here, one wing 270 may be disposed between the wing groups spaced farthest apart in a circumferential direction. Meanwhile, the number, position, and shape of the wings 210, 220, and 230 included in each of the wing groups 240, 250, and 260 may be equal. For example, the number, position, and shape of the wings 210, 220, and 230 may be equal such that the first wing group 250 overlaps with the reference wing group 240 or the second wing group 260 when the first wing group 250 is shifted along a circumferential direction. Meanwhile, all the wing groups included in the wing portion 200 may be arranged while being spaced at different distances apart in a circumferential direction.

FIG. 15 is a table illustrating a noise reduction effect caused by the anisotropy of the wings of the wing portion.

Referring to FIG. 15, noise was measured while the contained angle R1 between the first reference line L1 and the second reference line L2 and the contained angle R2 between the first reference line L1 and the third reference line L3 were changed in the rotor 20 having thirteen wings. In the table shown in FIG. 15, a sign "–" refers to directivity in a circumferential direction.

In consideration of a general reference noise level of 84.6 dB, it may be seen that noise is reduced entirely. Particularly, it was confirmed that noise is reduced to 81.8 dB by about 3 dB in comparison to the general reference noise level in Case 6.

FIG. 16 is a table illustrating a noise reduction effect caused by the anisotropy of the wing group of the wing portion.

Referring to FIG. 16, noise was measured while the contained angle R3 between the fourth reference line L4 and the fifth reference line L5 and the contained angle R4 between the fourth reference line L4 and the sixth reference line L6 were changed in the rotor 20 including thirteen wings. In the table shown in FIG. 16, a sign "–" refers to directivity in a circumferential direction.

In consideration of a general reference noise level of 84.6 dB, it may be seen that noise is greatly reduced as a whole. Particularly, it was confirmed that noise is reduced to 81.1 dB by about 3 dB in comparison to the general reference noise level in Case 3.

As described above, the rotor and the motor including the same according to one exemplary embodiment of the present invention have been described in detail with reference to the attached drawings.

The above description is merely for exemplarily describing the technical concept of the present invention, and a variety of modifications, changes, and replacements thereof may be made by one of ordinary skill in the art without departing from the essential features of the present invention. Accordingly, the embodiments disclosed herein and the attached drawings are not intended to limit and merely explain the technical concept of the present invention, and the scope of the present invention should not be limited by the above embodiment and the attached drawings. The scope of the present invention should be interpreted by the following claims and all technical concepts within the equivalent scope thereof should be interpreted as being included in the scope of the present invention.

DESCRIPTION OF REFERENCE NUMERALS

1: inner boundary, 2: outer boundary, 3: intermediate boundary, 10: housing, 11 and 12: through holes, 13: first housing, 14: second housing, 20: rotor, 21: rotor core, 22: first cover, 23: second cover, 30: rotating shaft, 40: stator, 100: body portion, 200: wing portion, 210: reference wing, 220: first wing, 230: second wing, 240: reference wing group, 250: first wing group, 260: second wing group

The invention claimed is:
1. A rotor comprising:
a rotor core; and
a cover disposed above the rotor core,
wherein the cover comprises a body portion and a plurality of wing portions formed above the body portion,
wherein the wing portion is disposed between an outer boundary, which is a circular curve, and an inner boundary, which is a circular curve,
wherein the wing portion comprises an inside portion and an outside portion,
wherein the inside portion includes a first inlet angle at a first point and a first outlet angle at a second point,
wherein the outside portion includes a second inlet angle at the second point and a second outlet angle at a third point, and
wherein the first point is located on the inner boundary, the second point is located on an intermediate boundary, which is a circular curve disposed between the outer boundary and the inner boundary, and the third point is located on the outer boundary,
wherein a height of the outside portion is equal from the intermediate boundary to the outside boundary, and a height of the inside portion is to increase from the inner boundary toward to the intermediate boundary,
wherein the cover comprises a first cover disposed on any one side of the rotor core and a second cover disposed on the other side of the rotor core, and
wherein at least one of the number and position of the wing portion of the first cover is different from the number or position of the wing portion of the second cover,
wherein at least one of:
the first inlet angle of the wing portion of the first cover is different from the first inlet angle of the wing portion of the second cover,
the first outlet angle of the wing portion of the first cover is different from the first outlet angle of the wing portion of the second cover,
the second inlet angle of the wing portion of the first cover is different from the second inlet angle of the wing portion of the second cover, or
the second outlet angle of the wing portion of the first cover is different from the second outlet angle of the wing portion of the second cover.
2. The rotor of claim 1, wherein a radius of the intermediate boundary is a value obtained by adding a radius of the inner boundary to 50% to 70% of a difference between a radius of the outer boundary and the radius of the inner boundary, the second inlet angle being within a range of 50° to 70°, the first outer angle being within a range of 60° to 80°, and the second outlet angle being within a range of 50° to 70°.

* * * * *